(12) United States Patent
Yang et al.

(10) Patent No.: US 7,843,518 B2
(45) Date of Patent: Nov. 30, 2010

(54) LCD APERTURE RATIOS

(75) Inventors: Sung-Hoon Yang, Yongin-si (KR);
So-Woon Kim, Suwon-si (KR);
Chong-Chul Chai, Seoul (KR);
Chang-Oh Jeong, Suwon-si (KR);
Eun-Guk Lee, Yongin-si (KR); Je-Hun Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 274 days.

(21) Appl. No.: 11/975,968

(22) Filed: Oct. 22, 2007

(65) Prior Publication Data

US 2008/0100788 A1    May 1, 2008

(30) Foreign Application Priority Data

Oct. 27, 2006  (KR)  ...................... 10-2006-0105005

(51) Int. Cl.
*G02F 1/1343* (2006.01)

(52) U.S. Cl. ........................... 349/38; 349/43; 349/138; 349/187

(58) Field of Classification Search .................... 349/38, 349/43, 138, 187
See application file for complete search history.

(56) References Cited

U.S. PATENT DOCUMENTS

2004/0150759 A1*  8/2004  Nishino et al. ................. 349/38

* cited by examiner

*Primary Examiner*—Thoi V Duong
(74) *Attorney, Agent, or Firm*—Innovation Counsel LLP

(57) ABSTRACT

A display substrate includes respective pluralities of gate lines, data lines, switching elements, storage lines, pixel electrodes, and an organic insulation layer. The gate lines and the data lines define a plurality of unit pixels. The storage lines are respectively formed adjacent to the respective drain electrodes of the respective switching elements of respective rows of the unit pixels. The organic insulation layer has a hole that is formed within the area of each of the unit pixels and that extends from a contact area formed at a portion of the corresponding drain electrode of the pixel to a portion corresponding to the storage line thereof. This arrangement enables the marginal area needed to prevent mismatch of the hole in the areas of the contact area and the storage line to be reduced, thereby increasing the aperture ratio of the display.

18 Claims, 8 Drawing Sheets

LCD APERTURE RATIOS

RELATED APPLICATIONS

This application claims priority of Korean Patent Application No. 2006-105005, filed Oct. 27, 2006, the entire disclosure of which is incorporated herein by reference.

BACKGROUND

The present invention relates to LCD display substrates and methods for manufacturing them. More particularly, the present invention relates to display substrates that improve display aperture ratio and methods for manufacturing such substrates.

A typical LCD array substrate includes respective pluralities of respectively parallel gate lines and data lines that intersect but are electrically insulated from each other, and a plurality of generally rectangular pixels defined by the intersecting gate and data lines. A storage line, a switching element and a pixel electrode are formed in each pixel. The storage lines are formed in the same layer as the gate lines. The switching element is connected to an associated gate line and an associated data line. The pixel electrode receives a pixel voltage from the switching element.

An insulative passivation layer is formed between the switching element and the pixel electrode, and a thick organic insulation layer is optionally formed on the passivation layer to planarize the surface of the substrate. A first hole is formed through the passivation layer and the organic insulation layer to partially expose an output terminal of the switching element, and the output terminal and the pixel electrode are electrically connected to each other through the first hole.

A second hole is formed through the organic insulation layer in an area corresponding to the storage line to reduce the spacing between the storage line and the pixel electrode so as to enable an associated storage capacitor to be charged easily.

In order to precisely locate the first hole over the output terminal of the switching element, the area of the output terminal has to provide a marginal area that is sufficiently large as to prevent any mismatch between the two features. Similarly, to precisely locate the second hole over the storage line, the area of the storage line must also provide a marginal area that is sufficiently large to prevent any mismatch. As a result, when display substrates employ an organic insulation layer, the aperture ratio of each pixel may be undesirably reduced.

BRIEF SUMMARY

In accordance with the exemplary embodiments described herein, LCD substrates and methods for making them are provided that eliminate the above problems and thereby enable the aperture ratio of the displays to be improved.

In one exemplary embodiment, a display substrate includes a plurality of gate lines, a plurality of data lines, a switching element, a storage line, an organic insulation layer and a pixel electrode. The gate lines are formed on a base substrate and extend in a first direction. The data lines extend in a second direction crossing the first direction. The intersecting gate lines and data lines define a plurality of unit pixels. The switching element is formed in each of the unit pixels and is electrically connected to an associated gate line and an associated data line. The storage line is formed adjacent to a drain electrode of the switching element and extends in the first direction. The organic insulation layer is formed on the base substrate and switching element. The organic insulation layer has a hole that is formed within the area of each of the unit pixels and extends from a contact area formed at a portion of the drain electrode to a portion corresponding to the storage line. The pixel electrode is formed on the organic insulation layer corresponding to each of the unit pixels, and makes contact with the contact area through the hole.

In another exemplary embodiment, a method for manufacturing a display substrate includes forming a passivation layer on a substrate. A plurality of unit pixels is defined by gate lines that extend in a first direction and data lines that extend in a second direction crossing the first direction, and a switching element, including a gate electrode, a source electrode and a drain electrode, and a storage line located adjacent to the drain electrode, are formed in each of the unit pixels on the substrate. An organic insulation layer is formed on the passivation layer. The organic insulation layer has a hole located within the area of each unit pixel that extends from a contact area of the pixel area to a portion corresponding to the storage line thereof. A pixel electrode is formed on the organic insulation layer and makes electrical contact with the contact area through the hole.

In accordance with the exemplary embodiments described herein, the marginal areas provided to the drain electrode and the storage line to prevent hole feature mismatching are substantially reduced, thereby improving the aperture ratio of the display substrate. A better understanding of the above and many other features and advantages of the novel display substrates and the methods for making them of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
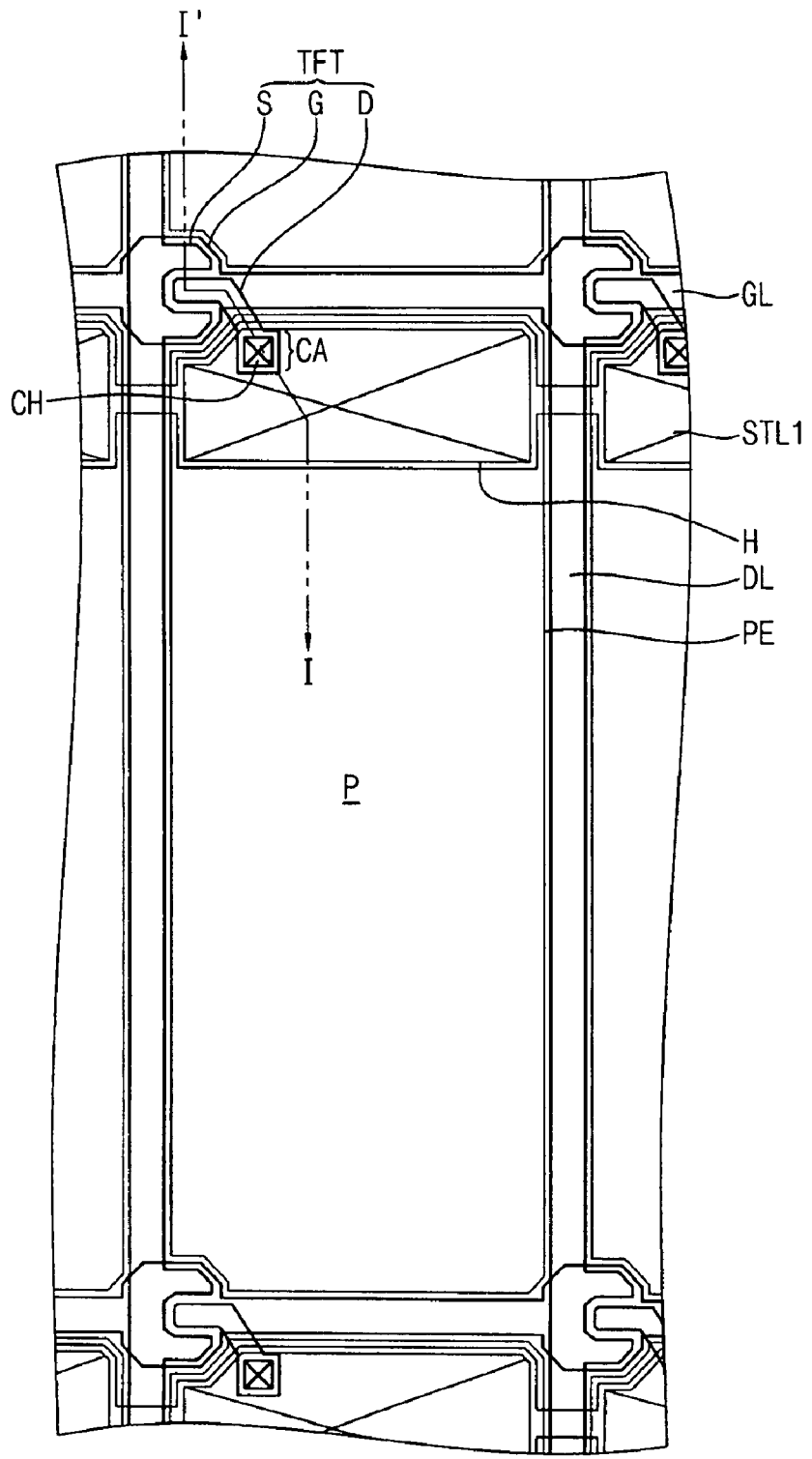
FIG. 1 is a partial plan view of an exemplary embodiment of an LCD substrate in accordance with the present invention, showing a single exemplary unit pixel thereof.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that when an element is referred to as being "on" or "onto" another element, it may be disposed directly on the other element, or one or more intervening elements may also be present. In contrast, when an element is referred to as being "directly on" another element, there are no intervening elements present. Like reference numerals refer to similar or identical elements throughout.

Figure 2:
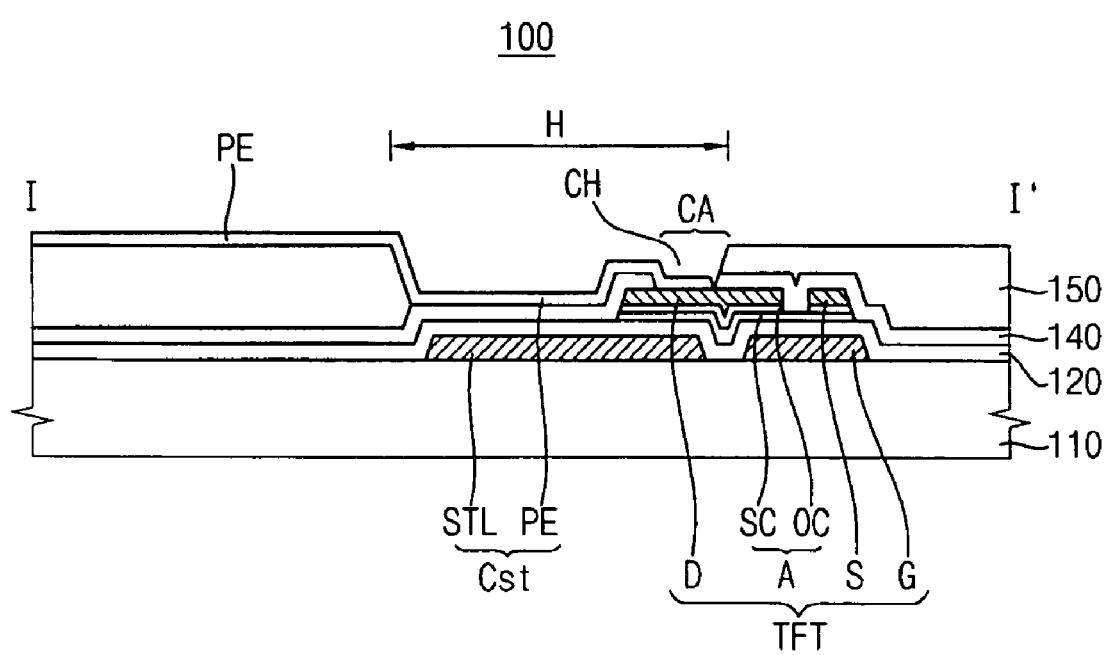
FIG. 2 is a partial cross-sectional view of the exemplary display substrate of FIG. 1, as seen along the lines of the section I-I' taken therein.

FIG. 1 is a partial plan view of an exemplary embodiment of an LCD substrate 100 in accordance with the present invention, showing a single exemplary unit pixel thereof, and FIG. 2 is a partial cross-sectional view of the exemplary substrate of FIG. 1, as seen along the lines of the section I-I' taken therein.

Referring to FIGS. 1 and 2, the first exemplary display substrate 100 includes a base substrate 110, a plurality of gate lines GL, a gate insulation layer 120, a plurality of data lines DL, a switching element TFT, a storage line STL1, a passivation layer 140, an organic insulation layer 150 and a pixel electrode PE.

The gate lines GL correspond to a first metal pattern formed by patterning a first metal layer. The gate lines GL are formed on the base substrate 110, and extend substantially parallel with each other.

The gate insulation layer 120 is formed on the base substrate 110 with the gate lines GL thereon. The gate insulation layer 120 includes, for example, silicon nitride (SiNx), silicon oxide (SiOx), or the like.

The data lines DL are formed on the gate insulation layer 120. The data lines DL cross the gate lines GL to define a plurality of unit pixels 'P'. The switching element TFT is formed in the unit pixel 'P', and is electrically connected to an associated one of the gate lines GL and an associated one of the data lines DL.

The switching element TFT includes a gate electrode 'G' protruding from the gate line GL, a source electrode 'S' protruding from the data line DL and partially overlapping the gate electrode 'G', and a drain electrode 'D' spaced apart from the source electrode 'S'.

An active layer pattern 'A' is formed over the gate electrode 'G' and between the source electrode 'S' and the drain electrode 'D' to serve as an electrical channel of each switching element TFT. The active layer pattern 'A' includes, for example, a semiconductor layer SC having amorphous silicon (a–Si:H) and an ohmic contact layer OC having ion-doped amorphous silicon (n+a–Si:H), which are successively formed. The ohmic contact layer OC is removed between the source electrode 'S' and the drain electrode 'D' to expose the semiconductor layer SC.

When a gate signal is applied from the gate line GL to the gate electrode 'G', an electrical channel is formed in the active layer pattern 'A', so that a pixel voltage provided from the data line DL is applied to the drain electrode 'D'. The drain electrode 'D' is electrically connected to the pixel electrode PE through a contact area CA formed at a portion of the drain electrode 'D' to thereby apply the pixel voltage to the pixel electrode PE.

The passivation layer 140 is formed on the base substrate 110 with the switching element TFT. The passivation layer 140 includes, for example, silicon nitride, silicon oxide, or the like. A contact hole CH is formed so as to expose the contact area CA of the drain electrode 'D'.

Each storage line STL1 is formed between adjacent pairs of the gate lines GL and extends in the same direction as the gate lines GL. Similar to the gate lines GL, the storage lines STL1 are formed from the first metal pattern. Each storage line STL1 extends through an associated row of the unit pixels and is disposed adjacent to the respective switching elements TFT thereof, and in the exemplary embodiment illustrated, partially overlaps the respective contact areas CA of the respective drain electrodes 'D' thereof.

An organic insulation layer 150 is formed on the passivation layer 140. The organic insulation layer 150 is thick enough to planarize the surface of the base substrate 110 having the gate lines GL, the data lines DL and the switching element TFT formed thereon.

In each of the unit pixels 'P', a hole 'H' is formed through the organic insulation layer 150. The hole 'H' extends from the contact area CA of the unit pixel to a portion corresponding to the storage line STL1 of the unit pixel. The hole 'H' is formed so as to enable the drain electrode 'D' of the unit pixel, which is an output terminal of the switching element TFT of the unit pixel, to be electrically connected to the pixel electrode PE thereof. The hole 'H' reduces the distance between the storage line STL1 and the pixel electrode PE to thereby increase a storage capacitance defined by the storage line STL1 and the pixel electrode PE.

A pixel electrode PE corresponding to each unit pixel P is formed on the organic insulation layer 150 with the hole 'H'. The pixel electrode PE includes, for example, a transparent conductive material, and makes contact with the contact area CA of the drain electrode 'D' through the hole 'H' and the contact hole CH in the hole 'H'. The transparent conductive material may include, for example, indium tin oxide, indium zinc oxide, or the like. The pixel electrode PE makes electrical contact with the drain electrode 'D' so as to be supplied thereby with a pixel voltage. Each pixel electrode PE, storage lines STL1, and the dielectric medium of the gate insulation layer 120 and the passivation layer 140 formed on the storage line STL1 together define a unit pixel storage capacitor Cst.

In the unit pixel of FIGS. 1 and 2, the drain electrode 'D' and the storage line STL1 overlap each other. Thus, a hole that exposes the contact area CA of the drain electrode 'D' through the organic insulation layer 150, and a hole that corresponds to the storage line STL1 are not formed separately, but instead, are integrally formed with each other.

When the hole 'H' is formed through the organic insulation layer 150 so as to be substantially perpendicular with respect to the organic insulation layer 150, an electrical short may undesirably be formed between the pixel electrode PE outside the hole 'H' and the pixel electrode PE inside the hole 'H' during the formation of the pixel electrode PE. Therefore, the hole 'H' is formed at an acute angle with respect to the base substrate 110. As a result, the area of the hole 'H' increases gradually from the lower portion to the upper portion thereof.

Since, in a conventional display substrate, the contact area CA is spaced apart from the storage line STL1, a first hole corresponding to the contact area CA and a second hole corresponding to the storage line STL1 must be formed separately from each other through the organic insulation layer 150.

Thus, in order to match the first hole closely with the contact area CA of the drain electrode 'D', the area of the drain electrode 'D' must be large enough to provide a marginal area that is sufficiently large so as to prevent any mismatch between the first hole and the contact area CA. Additionally, in order to match the second hole closely with the storage line STL1, the area of the storage line STL1 must be large enough to provide a margin that is sufficient to prevent any mismatch between the second hole and the storage line STL1. However, as those of skill in the art will appreciate, the enlarged marginal areas necessary to prevent the mismatches function to reduce the aperture ratio of the unit pixel P.

However, in the present invention, since the contact area CA and the storage line STL1 overlap each other, and since the hole 'H' is formed so as to correspond to both the contact area CA and the storage line STL1, the marginal area needed to prevent a mismatch between the hole 'H' and the drain electrode 'D' is markedly reduced. Therefore, the area of the contact area CA of the drain electrode 'D' is thus also reduced, and the aperture ratio of the unit pixel P is thereby improved.

In addition, since the contact area CA and the storage line STL1 overlap each other, and since the hole 'H' is formed so as to correspond to both the contact area CA and the storage line STL1, the marginal area needed to prevent a mismatch between the hole 'H' and the storage line STL1 is also markedly reduced. Therefore, the area of the storage line STL1 is thus also reduced, thereby further improving the aperture ratio of the unit pixel P.

Figure 3:
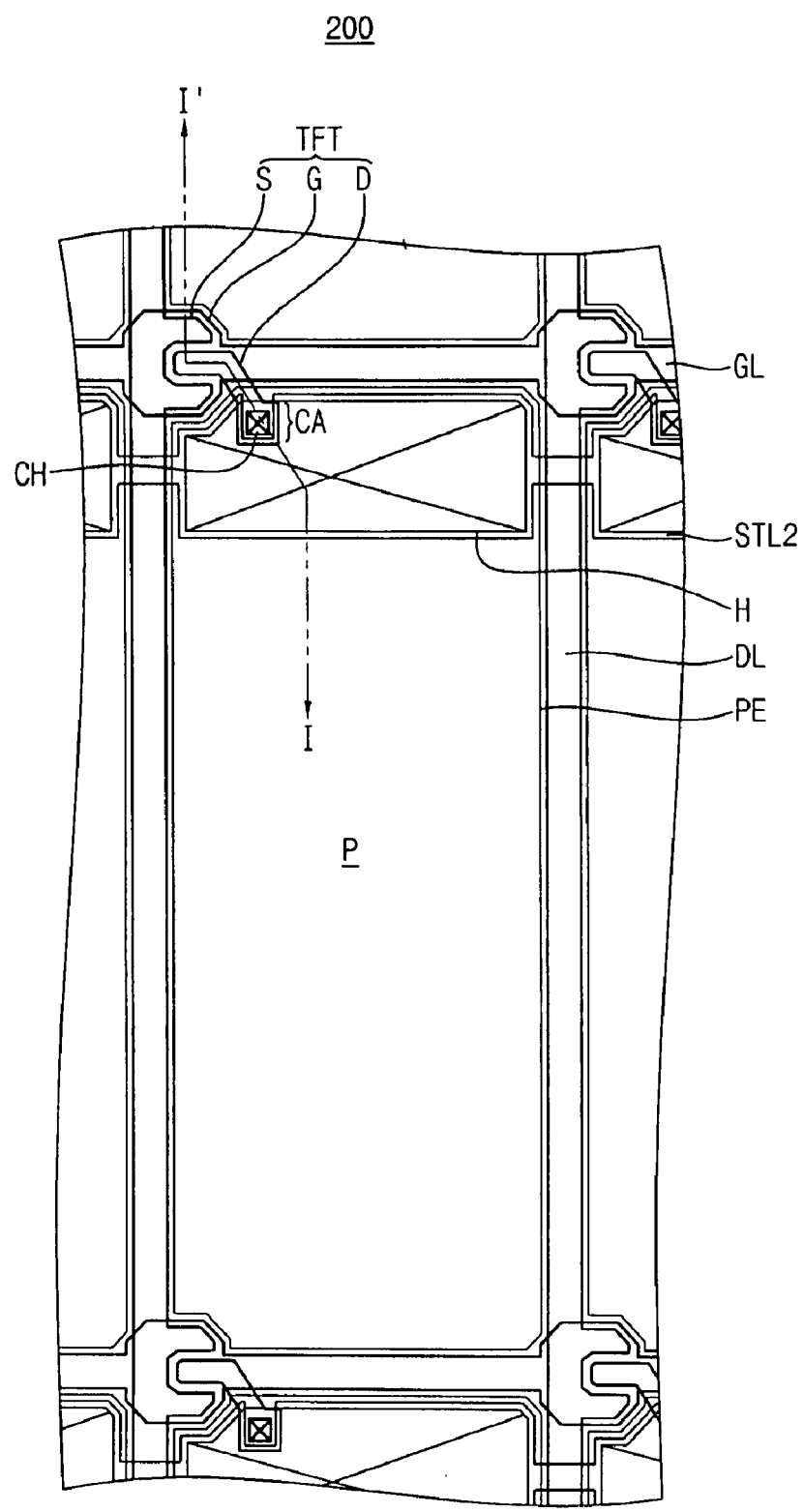
FIG. 3 is a partial plan view of another exemplary embodiment of a display substrate in accordance with the present invention, showing a single exemplary unit pixel thereof.

FIG. 3 is a partial plan view of another exemplary embodiment of a display substrate 200 in accordance with the present invention, showing a single exemplary unit pixel thereof. The second exemplary display substrate 200 is similar to the display substrate 100 of FIGS. 1 and 2. Thus, in the following description, only the differences between the two substrates 100 and 200 are described below for the sake of brevity.

Referring to FIG. 3, a storage line STL2 of the display substrate 200 is formed so as to overlap an edge portion of the respective contact areas CA of the drain electrodes 'D' of each unit pixel of the row of pixels through which the storage line STL2 extends. The contact hole CH formed through the passivation layer 140 and the hole 'H' formed through the organic insulation layer 150 are substantially the same as those of the first embodiment 100 above.

The active layer pattern 'A' is formed under the drain electrode 'D' to have a shape substantially identical to that of the drain electrode 'D', and the portion of the active layer pattern 'A' overlapped by both the storage line STL and the drain electrode 'D' may cause the dielectric constant of the storage capacitor Cst to vary. This variation can cause problems in a display substrate like the first exemplary substrate 100, such as a flicker. In contrast, in the second exemplary display substrate 200, the overlapping portions of the drain electrode 'D' and the storage line STL can be substantially reduced, as compared with those in the first embodiment 100. As a result, the dielectric constant of the respective storage capacitors Cst of the unit pixels is therefore maintained more consistently.

Thus, in comparison with the first exemplary embodiment 100 of FIG. 1 above, the flicker problem is substantially reduced in the second exemplary embodiment 200 of FIG. 3, while at the same time, its aperture ratio is improved.

Figure 4:
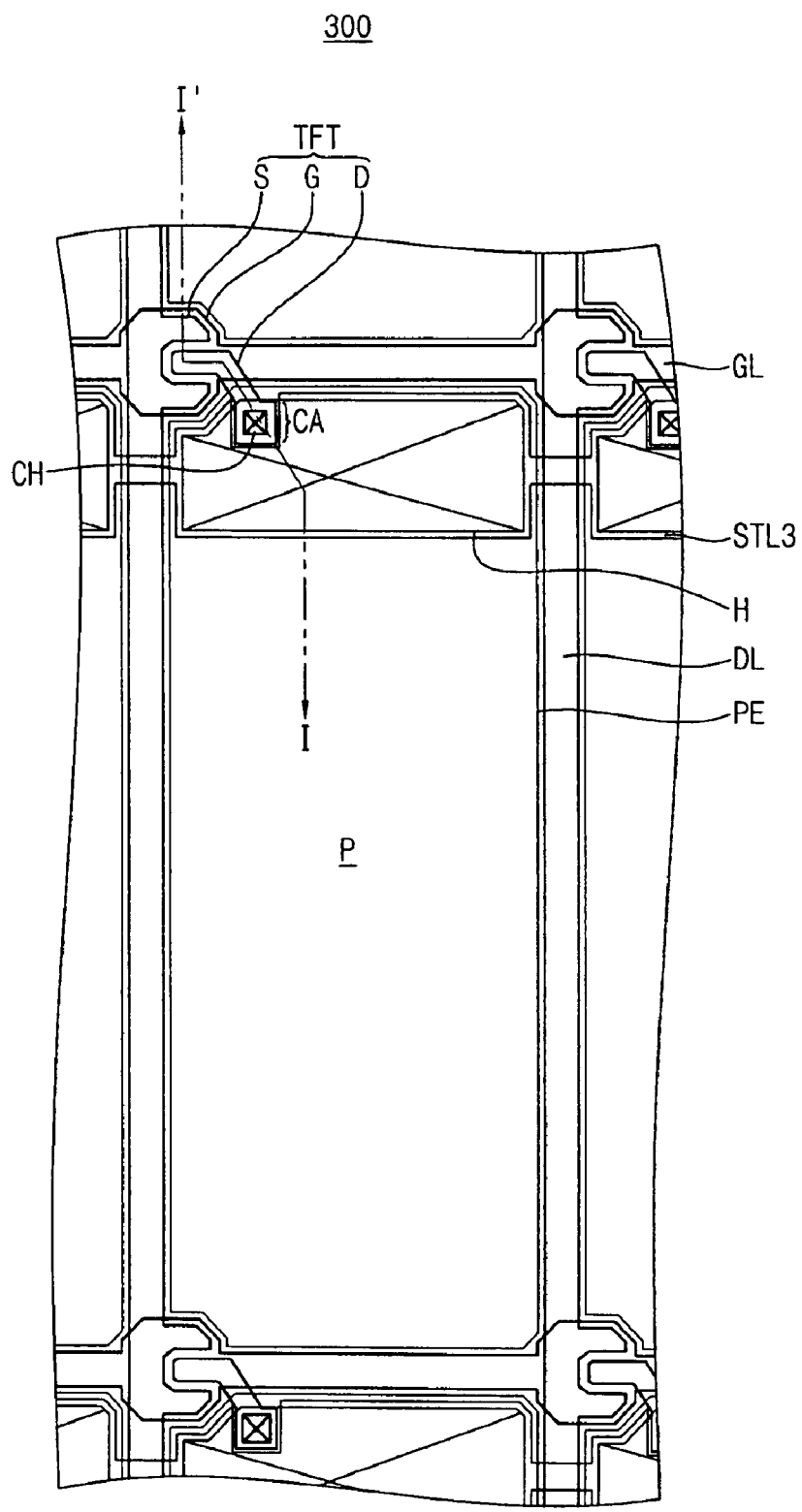
FIG. 4 is a partial plan view of yet another exemplary embodiment of a display substrate in accordance with the present invention, showing a single exemplary unit pixel thereof; and, FIGS. 5 to 11 are partial cross-sectional views illustrating sequential processes of an exemplary embodiment of a method for manufacturing a display substrate in accordance with the present invention.

FIG. 4 is a partial plan view of yet another exemplary embodiment of a display substrate 300 in accordance with the present invention, showing a single exemplary pixel thereof. The second exemplary substrate 300 is similar to the first exemplary display substrate 100 of FIG. 1. Thus, in the following description, only the differences between the two substrates 100 and 200 are described in detail.

Referring to FIG. 4, a storage line STL3 of the display substrate 300 is formed adjacent to the switching element TFT of each pixel of the row of pixels through which the storage line STL3 extends. A portion of the storage line STL3 adjacent to the contact area CA of the drain electrode 'D' corresponds to an edge portion of the contact area CA. The contact hole CH formed through the passivation layer 140 and the hole 'H' formed through the organic insulation layer 150 are substantially the same as in the first exemplary embodiment 100 above.

Thus, the aperture ratio of the display substrate 300 is improved, while at the same time, the drain electrode 'D' and the storage line STL are arranged so as not to overlap each other, which is different from the first and second embodiments 100 and 200 described above. Since the drain electrode 'D' and the storage line STL do not overlap each other, the dielectric constant of the active layer pattern 'A' formed under the drain electrode 'D' remains constant, i.e., does not vary. Thus, not only is the aperture ratio of the third exemplary display substrate 300 improved, but the storage capacitance of the storage capacitor Cst is also maintained more consistently.

An exemplary embodiment of a method for manufacturing a display substrate in accordance with the present invention is described below in conjunction with FIGS. 5 to 11, which are partial cross-sectional views illustrating sequential processes of the exemplary method.

Figure 5:
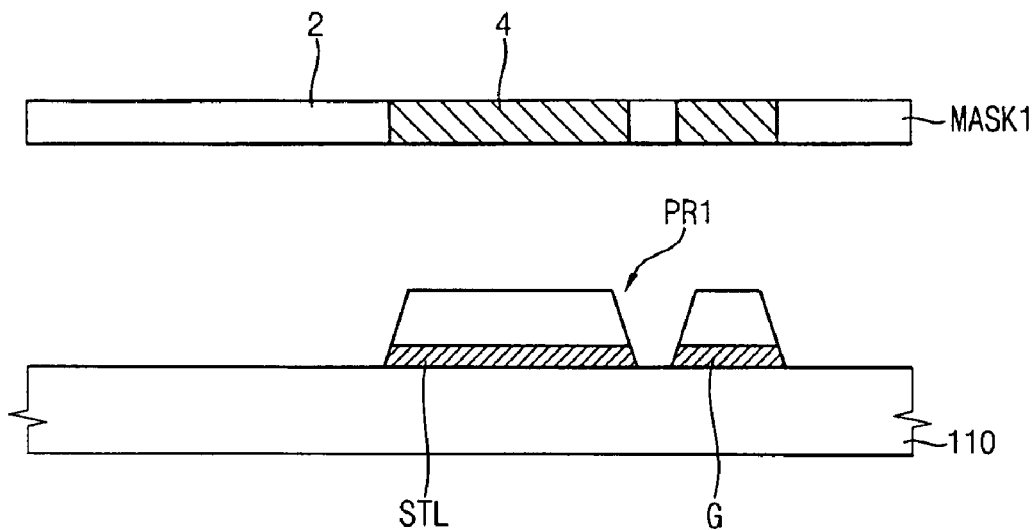

Referring to FIG. 5, a first metal layer (not illustrated) is formed on the base substrate 110. The first metal layer may include, for example, a metal, such as chromium, aluminum, tantalum, molybdenum, titanium, tungsten, copper, silver, and the like, or an alloy of one of the foregoing. The first metal layer may include at least two layers, each having physical characteristics that are different from the other. The first metal layer may be formed, for example, by a sputtering process.

A photoresist film (not illustrated) is then formed on the first metal layer, and the photoresist film is patterned using a photolithography process and a first mask MASK1 that includes a light-blocking portion 4 and a light-transmitting portion 2.

The photoresist film may comprise, for example, a positive photoresist, an exposed portion of which is dissolved by a developing solution. When an exposure process and a development process are performed using the first mask MASK1, the portion of the photoresist film corresponding to the light-blocking portion 4 is left remaining on the substrate after development, while the portion of the photoresist film corresponding to the light-transmitting portion 2 is removed, thereby forming a first photoresist pattern PR1 on the first metal layer.

Thereafter, an etch process is performed using the first photoresist pattern PR1 as an etching mask. The first metal layer is thereby patterned to form a first metal pattern, including the gate line GL (see, e.g., FIG. 1), the gate electrode 'G' of the thin film transistor TFT (FIG. 1) and the storage line STL1.

The gate line GL extends in a first direction on the base substrate 110, and the gate electrode 'G' protrudes out from the gate line GL.

The storage line STL1 extends in the first direction between adjacent pairs of the gate lines GL, and is disposed adjacent to the gate electrode 'G' of each unit pixel of the row of unit pixels through which the storage line STL1 extends.

After the first metal pattern is formed with the etch process, the first photoresist pattern PR1 is removed using a photoresist stripping solution.

Figure 6:
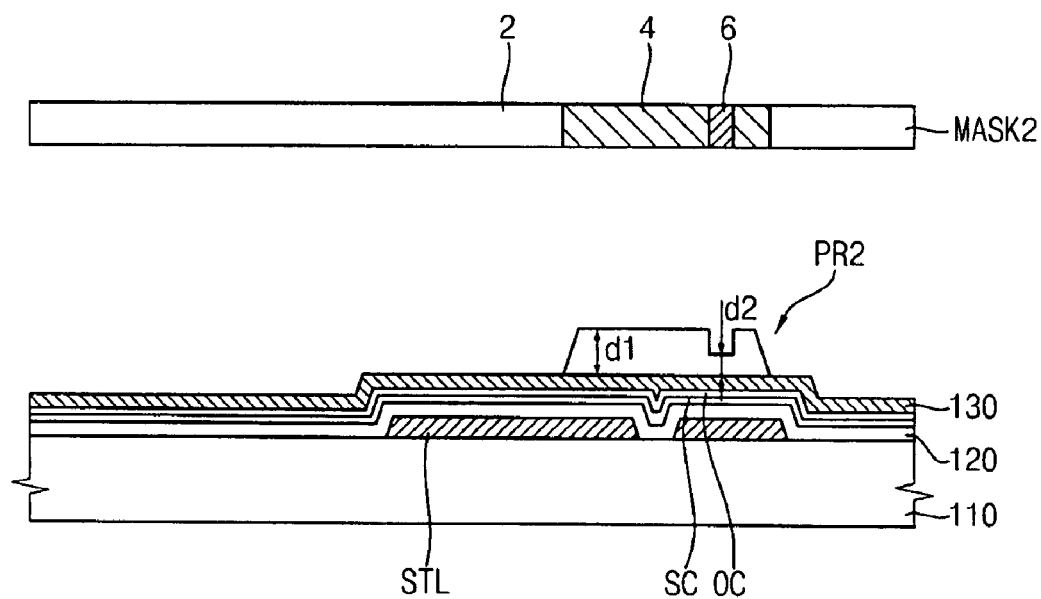

Referring now to FIG. 6, a gate insulation layer 120 comprising silicon nitride (SiNx) or silicon oxide (SiOx), a semiconductor layer SC including amorphous silicon (a–Si:H), and an ohmic contact layer OC having ion-doped amorphous silicon (n+a–Si:H), are successively formed on the base substrate 110 on which the first metal pattern is formed by means of a plasma enhanced chemical vapor deposition (PECVD) process.

A second metal layer 130 is then formed on the ohmic contact layer OC. The second metal layer 130 includes, for example, a metal, such as chromium, aluminum, tantalum, molybdenum, titanium, tungsten, copper, silver, or the like, or an alloy of any of the foregoing. The second metal layer may include at least two layers, each having different physical characteristics from those of the other. The second metal layer 130 may be formed by a sputtering process.

Thereafter, a photoresist film (not illustrated) is formed over substantially the entire surface of the second metal layer 130. The photoresist film may comprise, for example, a positive photoresist, an exposed portion of which, as above, is dissolved by a developing solution.

The photoresist film is then patterned using a photolithography process and a second mask MASK2. The second mask MASK2 includes a light-transmitting portion 2, a light-blocking portion 4 and a light semi-transmitting portion 6. When a first amount of light is projected through the light-transmitting portion 2, a second amount of light is projected through the light semi-transmitting portion 6. The second amount of light is about half of the first amount of light. The projected light is completely blocked by the light-blocking portion 4.

When the photoresist film exposed by the second mask MASK2 is developed by a developing solution, the photoresist film corresponding to the light-transmitting portion 2 is entirely removed by the developing solution.

A first portion of the photoresist film corresponding to the light-blocking portion 4 has a first thickness d1 that is substantially the same as that prior to the developing process.

A second portion of the photoresist film corresponding to the light semi-transmitting portion 6 has a second thickness d2 that is about half that of the first thickness d1. Thus, a second photoresist pattern PR2 that includes the first portion having the first thickness d1 and the second portion having the second thickness d2 are formed on the second metal layer 130.

Figure 7:
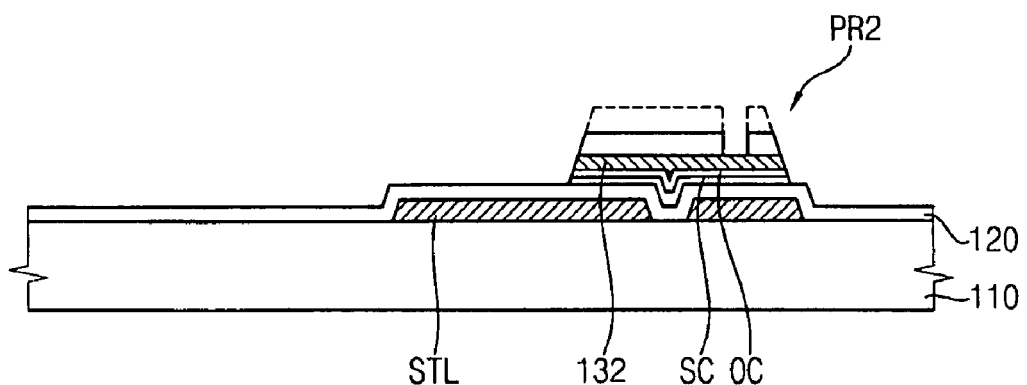

Referring to FIGS. 1, 6 and 7, the second metal layer 130 is first wet etched using the second photoresist pattern PR2 to form a second metal pattern, including an electrode pattern 132 and a data line DL, on the base substrate 110.

The data line DL extends in a second direction that crosses the first direction. Thus, the gate lines GL extending in the first direction and the data lines DL extending in the second direction define a plurality of unit pixels 'P' on the base substrate 110, an exemplary one of which is illustrated in the partial plan views of FIGS. 1, 3 and 4.

The electrode pattern 132 is connected to the data line DL, and overlaps the gate electrode 'G'. The electrode pattern 132 is patterned to form a source electrode 'S' and a drain electrode 'D' of the switching element TFT, and the source electrode 'S' and the drain electrode 'D' are not separate from each other, but instead, are connected to each other.

The ohmic contact layer OC and the semiconductor layer SC are then successively etched using the second photoresist pattern PR2 as an etching mask. Here, the ohmic contact layer OC and the semiconductor layer SC are dry etched. Thus, a portion disposed under the second metal pattern is patterned so as to be substantially identical to the second metal pattern to form the active layer pattern 'A' having the semiconductor layer SC and the ohmic contact layer OC.

Thereafter, an ashing process is performed using oxygen plasma to partially remove a predetermined thickness of the second photoresist pattern PR2. Accordingly, the second portion having the second thickness d2 that is about half of the first thickness d1 of the first portion is removed, and the first portion of the second photoresist pattern PR2 having a predetermined thickness is left remaining.

The electrode pattern 132 is then exposed through the removed second portion, and an exposed portion of the electrode pattern 132 is subjected to a second wet etching using the residual second photoresist pattern PR2 as a mask.

Figure 8:
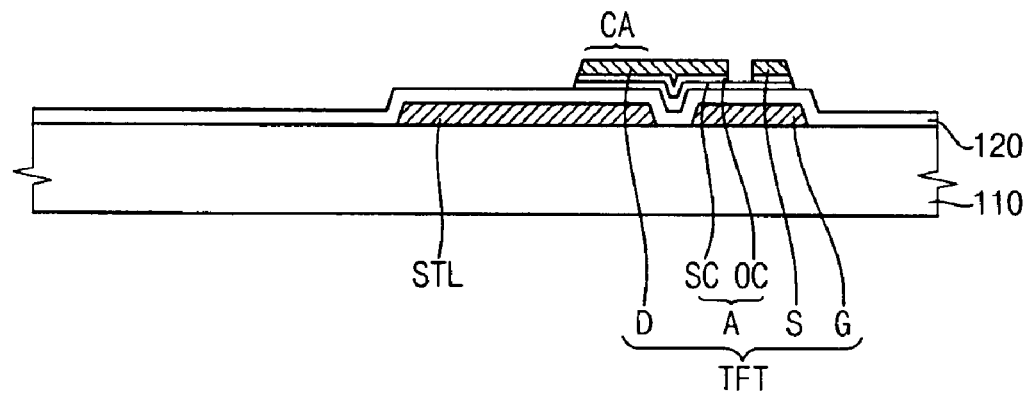

Referring to FIGS. 1 and 8, a source electrode 'S' protruding from the data line DL and a drain electrode 'D' spaced apart from the source electrode 'S' are thereby formed.

The source electrode 'S' and the drain electrode 'D' partially overlap the gate electrode 'G'. The contact area CA of the drain electrode 'D' that makes contact with the pixel electrode PE completely overlaps the associated storage line STL1. Alternatively, the associated storage line STL12 may be formed so as to only partially overlap an edge portion of the contact area CA, as illustrated in FIG. 3. In yet another alternative, a portion of the storage line STL13 adjacent to the contact area CA of the drain electrode 'D' may be formed so as to correspond in size and shape to an edge portion of the contact area CA, but such that it does not overlap the contact area CA, as illustrated in the exemplary embodiment of FIG. 4.

The ohmic contact layer OC of the active layer pattern 'A' is exposed between the source electrode 'S' and the drain electrode 'D'.

Then, the ohmic contact layer OC exposed between the source electrode 'S' and the drain electrode 'D' is etched. The ohmic contact layer OC may be, for example, dry etched.

Thus, the thin film transistor TFT is formed on the base substrate 110 to include the gate electrode 'G', the active layer pattern 'A', the source electrode 'S' and the drain electrode 'D'.

The second photoresist pattern PR2 remaining on the base substrate 110 after the thin film transistor TFT is formed is removed using a stripping process and stripping solution.

Figure 9:
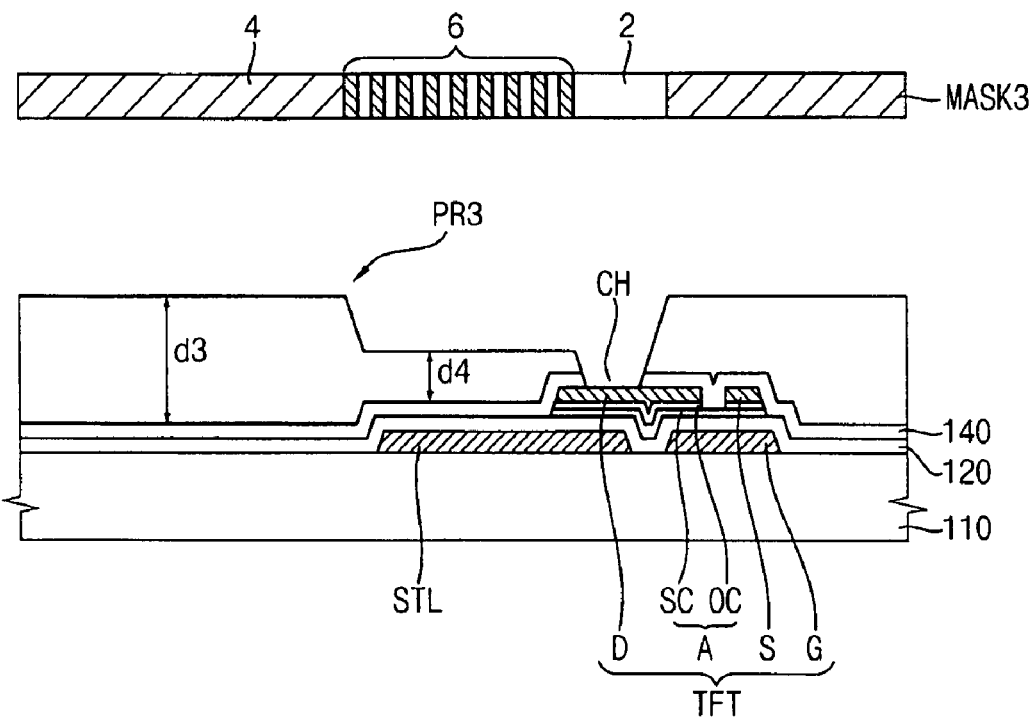

Referring to FIG. 9, a passivation layer 140 is formed on the gate insulation layer 120 on which the thin film transistor TFT is formed. The passivation layer 140, like the gate insulation layer 120, may comprise silicon nitride or silicon oxide, and may be formed by a plasma enhanced chemical vapor deposition (PECVD) process.

A photoresist film (not illustrated) having a third thickness d3 is formed on the passivation layer 140. The photoresist film includes, for example, a positive photoresist, an exposed portion of which is dissolved by a developing solution. The photoresist film is then patterned through a photolithography process using a third mask MASK3 that includes a light-transmitting portion 2, a light-blocking portion 4 and a diffraction portion 6.

The MASK3 is configured such that the amount of light passing through the diffraction portion 6 is about half that passing through the light-transmitting portion 2. For example, a plurality of slits may be patterned in the light-blocking portion 4 to form the diffraction portion 6, or alternatively, the diffraction portion 6 may be formed to include a halftone material.

The light-transmitting portion 2 of the third mask MASK3 is disposed so as to correspond to the contact area CA. The diffraction portion 6 is disposed so as to correspond to the storage line STL1. The light-blocking portion 4 is disposed over the remainder of the unit pixel area.

Since the photoresist film includes a positive photoresist, an exposed portion of which is dissolved by a developing solution, after the photoresist film exposed by the third mask MASK3 is developed, a portion of the photoresist film having a third thickness d3, which is substantially the same as the thickness prior to the developing process, is left remaining in the area corresponding to the light-blocking portion 4.

The portion of the photoresist film that was exposed through the light-transmitting portion 2 is entirely dissolved by the developing solution, thereby forming a contact hole CH that exposes an area of the passivation layer 140 corresponding to the contact area CA.

Since the portion of the photoresist film corresponding to the diffraction portion 6 is only about half dissolved by the developing solution, the portion of the photoresist film remaining on the storage line STL1 has a fourth thickness d4 that is about half of the third thickness d3.

Thus, a third photoresist pattern PR3 is formed on the passivation layer 140 that includes a portion having the third thickness d3, a portion having a fourth thickness d4 and the contact hole CH.

The exposed passivation layer 140 is then etched using the third photoresist pattern PR3 as an etching mask. The passivation layer 140 may, for example, be dry etched. Thus, the contact hole CH is thereby further formed in the passivation layer 140 so as to expose the contact area CA of the drain electrode 'D'.

Thereafter, a predetermined thickness of the third photoresist pattern PR3 is etched away. In particular, a thickness of the photoresist pattern PR3 equal to or greater than the fourth thickness d4 is dry etched away.

Figure 10:
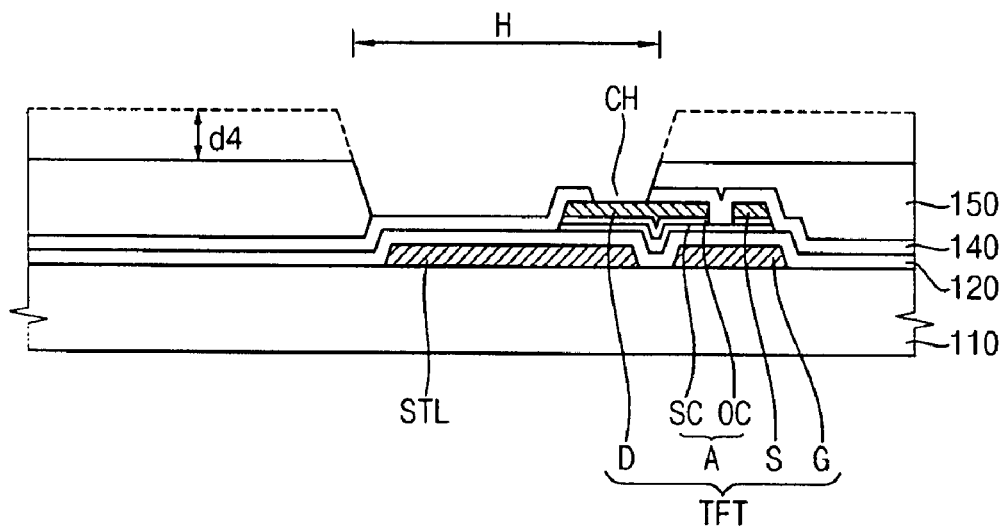

Referring to FIG. 10, since the third photoresist pattern PR3 formed on the storage line STL1 is entirely removed so as to form an organic insulation layer 150 on the passivation layer 140, the organic insulation layer 150 has a hole 'H' extending from the contact area CA of the drain electrode 'D' to a portion corresponding to the storage line STL1.

Figure 11:
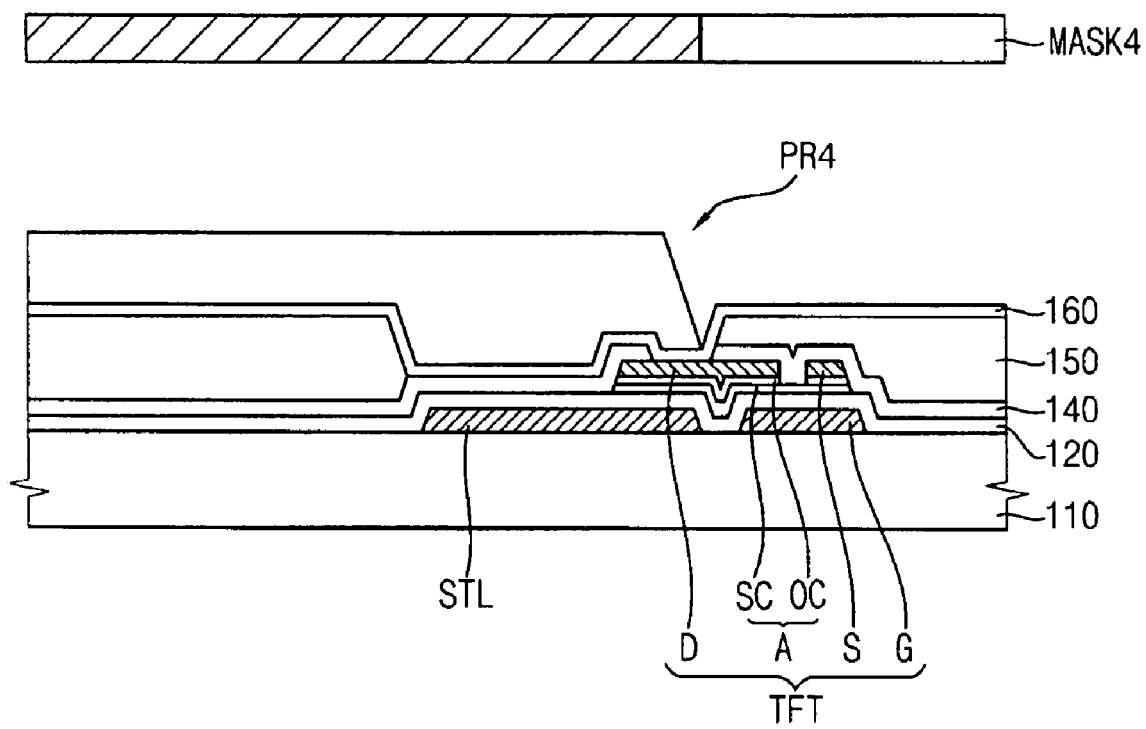

Referring to FIG. 11, a transparent electrode layer 160 is formed on the base substrate 110 having the hole 'H'. The transparent electrode layer 160 may include, for example, indium tin oxide, indium zinc oxide, amorphous indium tin oxide, or the like. The transparent electrode layer 160 may be formed by a sputtering process.

A photoresist film (not illustrated) is then formed on the transparent electrode layer 160, and the photoresist film is patterned with a photolithography process using a fourth mask MASK4 to form a fourth photoresist pattern PR4 corresponding to the unit pixel 'P'. Thereafter, the transparent electrode layer 160 is etched using the fourth photoresist pattern PR4 as a mask to form a pixel electrode PE that makes contact with the contact area CA of the drain electrode 'D'. For example, the pixel electrode PE may be wet etched.

After the pixel electrode PE is formed by the etching process, a stripping process is performed to remove the fourth photoresist pattern PR4, concluding the final step in the manufacture of the display substrate 100 illustrated in FIG. 2.

In accordance with the exemplary LCD substrate embodiments described and illustrated herein, the drain electrode and the storage line are formed adjacent to each other, or so as to overlap each other, and one hole is formed in the organic insulation layer to extend from the contact area to a portion corresponding to the storage line. Thus, the size of the marginal areas needed in the drain electrode and the storage line areas to prevent mismatch is substantially reduced.

As a result, in comparison with conventional substrate structures, in which holes corresponding to the contact area and the storage line are independently formed, the aperture ratio of the display substrates of the present invention is substantially improved.

As those of skill in this art will by now appreciate, many modifications, substitutions and variations can be made in and to the materials, methods and configurations of the display substrates of the present invention and to their methods of manufacture without departing from the spirit and scope of the invention. In light of this, the scope of the present invention should not be limited to that of the particular embodiments illustrated and described herein, as they are only by way of some examples thereof, but instead, should be fully commensurate with that of the claims appended hereafter and their functional equivalents.

What is claimed is:

1. A display substrate, comprising:
   a gate line formed on a base substrate and extending in a first direction;
   a data line formed on the base substrate and extending in a second direction crossing the first direction;
   a switching element formed in a unit pixel and electrically connected to the gate line and the data line;
   a storage line formed on the base substrate;
   an organic insulation layer formed on the base substrate, the organic insulation layer having a hole formed within the area of the unit pixel and extending from a contact area formed at a portion of the drain electrode of the unit pixel to a portion corresponding to the storage line thereof; and,
   a pixel electrode corresponding to the unit pixel formed on the organic insulation layer and overlapping with the storage line and making electrical contact with the contact area of the unit pixel through the hole,
   wherein a storage capacitor is defined by the storage line and the pixel electrode, and
   the storage line overlaps an edge portion of the contact area of the unit pixel.

2. The display substrate of claim 1, further comprising a passivation layer formed between the switching element and the organic insulation layer and having a contact hole formed within the area of the unit pixel that exposes the contact area thereof.

3. The display substrate of claim 1, further comprising a gate insulation layer formed between the gate line and the data line.

4. The display substrate of claim 3, further comprising an active layer pattern formed between the gate insulation layer and the data line, the active layer pattern having a shape substantially identical to that of the data line except a channel.

5. The display substrate of claim 4, wherein the storage line overlaps the contact area.

6. A method for manufacturing a display substrate, the method comprising:
   forming a gate line that extends in a first direction on a base substrate;
   forming a data line that extends in a second direction crossing the first direction on the base substrate;
   forming a switching element in a unit pixel, the switching element being electrically connected to the gate line and the data line;
   forming a storage on the base substrate;
   forming an organic insulation layer on the base substrate, the organic insulation layer having a hole formed within the area of the unit pixel and extending from a contact area formed at a portion of the drain electrode of the unit pixel to a portion corresponding to the storage line thereof; and,
   forming a pixel electrode corresponding to the unit pixel on the organic insulation layer, the pixel electrode overlapping with the storage line and making electrical contact with the contact area of the unit pixel through the hole,
   wherein a storage capacitor is defined by the storage line and the pixel electrode, and the storage line overlaps an edge portion of the contact areas of the unit pixel.

7. The method of claim 6, further comprising:
   forming a first metal pattern on the base substrate, the first metal pattern including the gate line, the storage line and the gate electrode; and, forming a second metal pattern on the base substrate, the second metal pattern including the data line, the source electrode and the drain electrode.

8. The method of claim 7, wherein forming the second metal pattern comprises:
successively forming a gate insulation layer, an active layer and a metal layer on the base substrate;
patterning the metal layer to form the second metal pattern; and,
patterning the active layer to form an active layer pattern having a shape that is substantially identical to that of the second metal pattern.

9. The method of claim 8, wherein the contact area overlaps the storage line.

10. The method of claim 6, prior to forming the organic insulation layer, further comprising forming a passivation layer on the base substrate.

11. The method of claim 10, wherein forming the organic insulation layer comprises:
forming a photoresist pattern on the passivation layer, the photoresist pattern having a first thickness in an area corresponding to the storage line, a second thickness in an area corresponding to a remaining portion thereof excluding the storage line, and a contact hole corresponding to the contact area; and,
uniformly etching away the first thickness of the photoresist pattern to form the organic insulation layer containing the contact hole extending from the contact area of the unit pixel to a portion corresponding to the storage line thereof.

12. The method of claim 11, further comprising etching the passivation layer exposed through the contact hole so as to expose the contact area.

13. A display substrate, comprising:
a gate line formed on a base substrate and extending in a first direction;
a data line formed on the base substrate and extending in a second direction crossing the first direction;
a switching element formed in a unit pixel and electrically connected to the gate line and the data line;
a storage line formed on the base substrate;
an organic insulation layer formed on the base substrate, the organic insulation layer having a hole formed within the area of the unit pixel and extending from a contact area formed at a portion of the drain electrode of the unit pixel to a portion corresponding to the storage line thereof; and,
a pixel electrode corresponding to the unit pixel formed on the organic insulation layer and overlapping with the storage line and making electrical contact with the contact area of the unit pixel through the hole,
wherein a storage capacitor is defined by the storage line and the pixel electrode, and
a portion of the storage line adjacent to the contact area of the unit pixel corresponds in shape and size to, but does not overlap, an edge portion of the contact area.

14. The display substrate of claim 13, further comprising a passivation layer formed between the switching element and the organic insulation layer and having a contact hole formed within the area of the unit pixel that exposes the contact area thereof.

15. The display substrate of claim 13, further comprising a gate insulation layer formed between the gate line and the data line.

16. The display substrate of claim 15, further comprising an active layer pattern formed between the gate insulation layer and the data line, the active layer pattern having a shape substantially identical to that of the data line except a channel.

17. The display substrate of claim 16, wherein the storage line overlaps the contact area.

18. A method for manufacturing a display substrate, the method comprising:
forming a gate line that extends in a first direction on a base substrate;
forming a data line that extends in a second direction crossing the first direction on the base substrate;
forming a switching element in a unit pixel, the switching element being electrically connected to the gate line and the data line;
forming a storage on the base substrate;
forming an organic insulation layer on the base substrate, the organic insulation layer having a hole formed within the area of the unit pixel and extending from a contact area formed at a portion of the drain electrode of the unit pixel to a portion corresponding to the storage line thereof; and,
forming a pixel electrode corresponding to the unit pixel on the organic insulation layer, the pixel electrode overlapping with the storage line and making electrical contact with the contact area of the unit pixel through the hole,
wherein a storage capacitor is defined by the storage line and the pixel electrode, and
a portion of the storage line adjacent to the contact area corresponds in shape and size to an edge portion of the contact area.

* * * * *